United States Patent
Zhang et al.

(10) Patent No.: US 10,863,255 B2
(45) Date of Patent: Dec. 8, 2020

(54) METHOD AND SYSTEM FOR OPTICAL PATH RESTORATION

(71) Applicant: Cisco Technology, Inc., San Jose, CA (US)

(72) Inventors: Randy Zhang, Plano, TX (US); Gabriele Maria Galimberti, Bovisio Masciago (IT); Stefano Piciaccia, Milan (IT); Mauro Brunella, Brugherio (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/386,309

(22) Filed: Apr. 17, 2019

(65) Prior Publication Data
US 2020/0336809 A1    Oct. 22, 2020

(51) Int. Cl.
*H04Q 11/00* (2006.01)
*H04L 12/703* (2013.01)
*H04L 12/707* (2013.01)

(52) U.S. Cl.
CPC ........ *H04Q 11/0062* (2013.01); *H04L 45/22* (2013.01); *H04L 45/24* (2013.01); *H04L 45/28* (2013.01); *H04Q 2011/0073* (2013.01); *H04Q 2011/0081* (2013.01); *H04Q 2011/0083* (2013.01)

(58) Field of Classification Search
CPC combination set(s) only.
See application file for complete search history.

(56) References Cited

U.S. PATENT DOCUMENTS

| | | | |
|---|---|---|---|
| 6,073,248 A | 6/2000 | Doshi et al. | |
| 2003/0236916 A1* | 12/2003 | Adcox | H04L 61/2596 709/245 |
| 2004/0196783 A1* | 10/2004 | Shinonniya | H04L 41/0668 370/216 |
| 2006/0171712 A1* | 8/2006 | Tanaka | H04Q 11/0062 398/45 |

(Continued)

OTHER PUBLICATIONS

Ciena® Corporation, "The Power of End-To-End Network Intelligence", Jul. 2012, 6 pages.*

(Continued)

*Primary Examiner* — Omar S Ismail
(74) *Attorney, Agent, or Firm* — Edell, Shapiro & Finnan, LLC (57) ABSTRACT

A method for optical restoration in an optical network is provided. A network controller obtains, from one or more optical nodes of an optical network, at least one failure notification indicating a failure of a primary path between a first node and a second node. The network controller forwards to a first set of optical nodes, data-plane parameters for optical components of the first set of optical nodes. The first set of optical nodes include the first node, the second node, and one or more intermediate nodes, and forms a restoration path for the primary path. The data-plane parameters for the optical components are forwarded in parallel to the first set of optical nodes of the restoration path so as to activate the restoration path in parallel. The network controller switches traffic from the primary path to the restoration path.

20 Claims, 9 Drawing Sheets

(56) References Cited

U.S. PATENT DOCUMENTS

| | | | | |
|---|---|---|---|---|
| 2008/0056159 | A1* | 3/2008 | Suzuki | H04L 45/28 370/254 |
| 2011/0116798 | A1* | 5/2011 | Kai | H04Q 11/0067 398/58 |
| 2012/0183294 | A1* | 7/2012 | Boertjes | H04J 14/0268 398/49 |
| 2013/0121683 | A1* | 5/2013 | Nagamine | H04L 41/0686 398/2 |
| 2013/0236169 | A1* | 9/2013 | Gaudette | H04B 10/0795 398/25 |
| 2015/0208147 | A1* | 7/2015 | Martinelli | H04J 14/0293 398/5 |
| 2016/0026542 | A1 | 1/2016 | Vasseur et al. | |
| 2017/0302371 | A1* | 10/2017 | Martinelli | H04Q 11/0005 |
| 2018/0220210 | A1* | 8/2018 | Paraschis | H04J 14/0271 |

OTHER PUBLICATIONS

Eisenach, Randy, "Optical Layer Restoration: Improving Efficiency", May 19, 2017, 7 pages.*

Infinera Transcend Software Suite, "Infinera Virtualized Control Plane for Automatically Switched Optical Network (vASON)", 0175-SB-RevA-0519, downloaded Jul. 1, 2020, 3 pages.*

Jiwon Lee et al., "Optical-Layer Restoration in a Self-Healing Ring Network Using a Wavelength-Blocker-based Reconfigurable Optical Add/Drop Multiplexer", Current Optics and Photonics vol. 2, No. 1, DOI: https://doi.org/10.3807/COPP.2018.2.1.023, Feb. 2018, pp. 23-26, 4 pages.

Radim Bartos et al., "Fast Restoration Signaling in Optical Networks", https://www.researchgate.net/publication/2929798_Fast_Restoration_Signaling_in_Optical_Networks, Nov. 2002, 6 pages.

Weiwei Bian et al., "Parallel signaling-based fast restoration scheme in distributed optical networks", col. 10(3), 030602(2012), Chinese Optics Letters, Mar. 10, 2012, 5 pages.

Mohamed Mostafa A. Azim et al., "A New Scheme for Lightpath Restoration in WDM Networks", Proceedings of the 2004 International Conference on Parallel Processing Workshops (ICPPW'04), https://ieeexplore.ieee.org/document/1328043, Aug. 2004, 6 pages.

* cited by examiner

METHOD AND SYSTEM FOR OPTICAL PATH RESTORATION

TECHNICAL FIELD

The present disclosure relates to techniques for optical path restoration.

BACKGROUND

In an optical communication network, when a working (primary) optical path fails, a restoration optical path is set up to restore the traffic previously carried by the working path. The process to set up a functioning restoration path is called path restoration, which typically includes two stages. The first stage involves control plane path signaling, and the second stage includes data plane path activation. Typically, a source optical node (headend) or a destination optical node (tailend) of a working path receives a notification indicating a path failure in the working path. The source optical node or the destination optical node then computes a restoration path that can connect the source node and the destination node. Nodes on the restoration path are then configured with path signaling and activation processes. Once the path signaling and activation processes are successfully implemented on the nodes of the restoration path, the source node begins to direct traffic to the destination node through the restoration path.

DESCRIPTION OF EXAMPLE EMBODIMENTS

Overview

A method for optical restoration in an optical network is provided. A network controller obtains, from an optical node of an optical network, a failure notification indicating a failure of a primary path between a first node and a second node. The network controller forwards to a first set of optical nodes, data-plane parameters for optical components of the first set of optical nodes. The first set of optical nodes include the first node, the second node, and one or more intermediate nodes, and forms a restoration path for the primary path. The data-plane parameters for the optical components are forwarded in parallel to the first set of optical nodes of the restoration path so as to activate the restoration path. The network controller switches traffic from the primary path to the restoration path.

Example Embodiments

Optical restoration in an optical network is a way of protecting working traffic when a working/primary (W) path fails. A new (restoration) path is dynamically set up for switching traffic from the failed path to the new path. For example, in an optical network that includes reconfigurable optical add-drop multiplexer (ROADM) nodes, working path traffic can be restored on-demand without permanently tying up network resources. Restoration is generally a slow process and is often used to restore traffic that does not need fast recovery. Restoration or on-demand restoration (R) time includes two main components: control plane path signaling and data plane path activation. Though the total restoration time depends on a variety of factors such as the number of nodes on the restoration path and type of optical components, it typically takes tens of seconds or even minutes to complete. In general, less than 10% of the restoration time is spent on path signaling and over 90% of the restoration time is used for path activation because path activation typically includes serially tuning optical components, such as Variable Optical Attenuators (VOAs), on the restoration path.

Traditional methods of restoration are slow because they involve serial tuning by network nodes and start the tuning with VOA attenuation set to a maximum value. The nodes in the restoration path then take turns (i.e., serially) to try to reach the correct attenuation point in a closed loop. Because this takes time, the restoration mechanism is generally used as a last resort for traffic recovery after other faster protection mechanisms are exhausted. Techniques disclosed herein can reduce the data-plane path activation time and thus the overall time taken to complete optical restoration.

Figure 1:
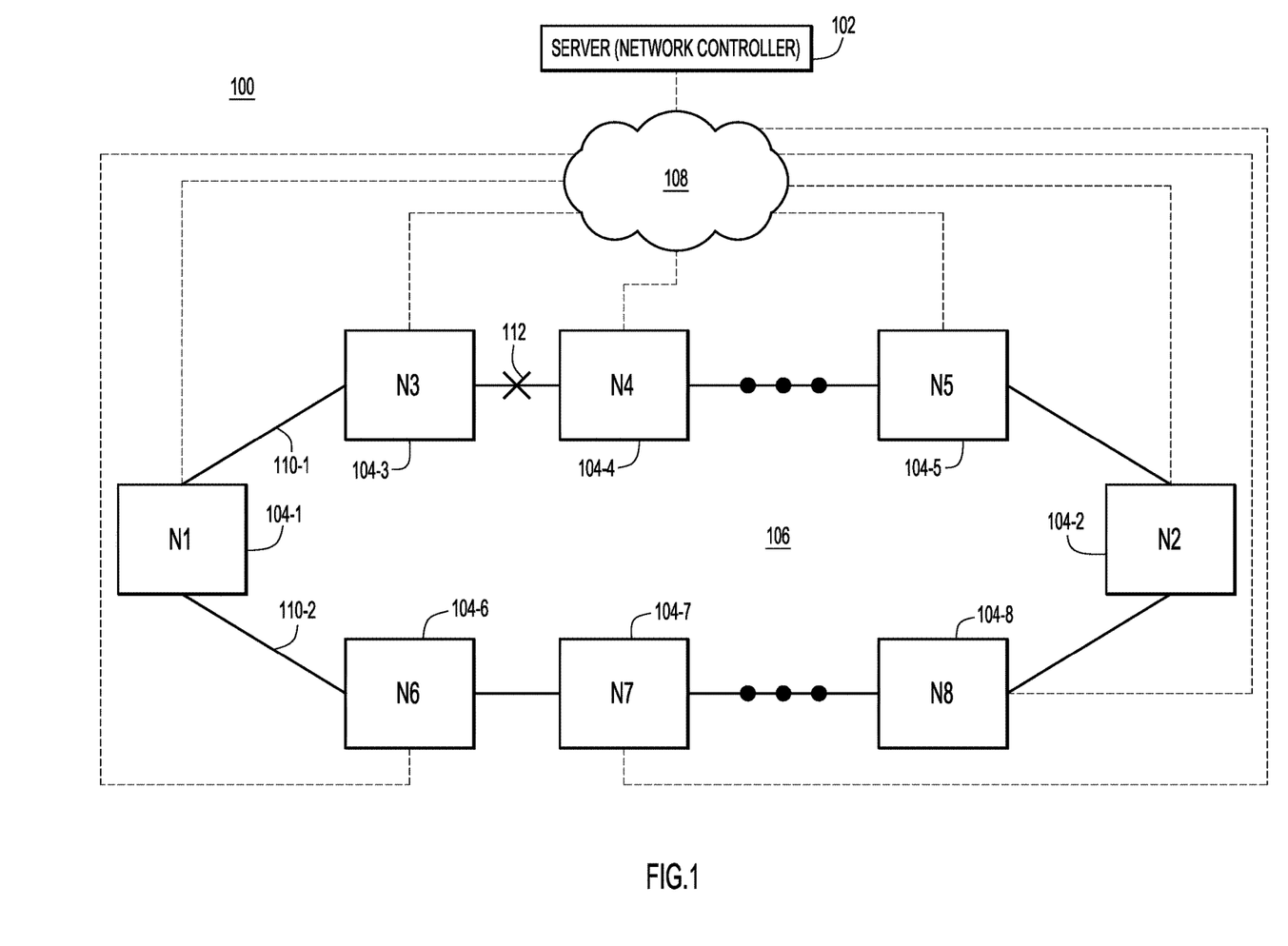
FIG. 1 illustrates a system in which techniques for switching communication traffic from a primary optical path to a restored optical path may be implemented, according to an example embodiment.

Example embodiments will be described with reference to the accompanying figures. Reference is first made to FIG. 1. FIG. 1 illustrates a system 100 in which techniques for switching communication traffic from a primary optical path to a restoration optical path may be implemented, according to an example embodiment. The system 100 includes a server/network controller 102 for controlling restoration of optical paths in the system 100. In some embodiments, the system 100 may include one or more network controllers 102 for redundancy. The system 100 further includes a plurality of optical nodes 104-1 to 104-8 (denoted N1 to N8) that form an optical network 106. It is to be understood that more or fewer optical nodes can be included in the optical network 106. In some embodiments, the optical nodes 104-1 to 104-8 are ROADM nodes. The optical nodes 104-1 to 104-8 are connected to the network controller 102 through a control plane network 108, e.g., a wide area network (WAN). The optical nodes 104-1 to 104-8 may form one or more optical paths to communicate traffic in the network 106. For example, a user may desire to set up an optical path between node N1 and node N2. The user may use the network controller 102 to determine the optical path.

In some embodiments, the network controller 102 is configured to compute a plurality of paths from node N1 (source) to node N2 (destination) based on network resources in the optical network 106. Because the network resources may change over time, the network controller 102 may be configured to recompute paths from node N1 to node N2 periodically or upon a particular network resource change. In some embodiments, resource changes in the optical network 106 are communicated to the network controller 102 by the nodes 104-1 to 104-8 to update alternate paths or for path computation. In near real-time synchronization with the network, the optical nodes 104-1 to 104-8 provide streaming telemetry updates at a relatively short frequency (such as 1-5 seconds) to the network controller 102 for changes to the path resources. The network controller 102 can use these messages to determine the status of the nodes 104-1 to 104-8. As illustrated in FIG. 1, the network controller determines at least two optical paths 110-1 and 110-2 between the source node N1 and the destination node N2. The path 110-1 includes the source node N1, the destination node N2, and one or more intermediate nodes N3, N4, and N5. The path 110-2 includes the source node N1, the destination node N2, and one or more intermediate nodes N6, N7, and N8. Although three intermediate nodes are illustrated for one optical path in FIG. 1, it is to be understood that more or fewer intermediate nodes may be included in the optical paths.

After the network controller 102 determines the plurality of optical paths between the source node N1 and the destination node N2, the network controller 102 may be configured to select a primary path and a restoration path from the plurality of paths, based on a user path-selection policy. For example, the network controller 102 may sort the optical paths to select a primary path and a restoration path based on user-provided path performance metrics, such as latency, a number of hops, resource availability, etc. In one embodiment, the first two available best paths that satisfy path constraints provided by the path policy are selected as the primary path and the restoration path. For example, path constraints may include disjointness, Shared Risk Link Group (SRLG), etc. For explanatory purposes, the network controller 102 selects the optical path 110-1 as the primary path and the optical path 110-2 as the restoration path.

After the primary path 110-1 and the restoration path 110-2 are selected, the network controller 102 is configured to perform signaling of the primary path 110-1 in a control plane, and activating the primary path 110-1 in a data-plane so as to set up the primary path for transmitting traffic from the source node N1 to the destination node N2. In some embodiments, when activating the primary path in the data-plane, the network controller 102 determines and forwards initial data-plane parameters for optical components of the optical nodes in the primary path 110-1 to the optical nodes in the primary path 110-1 to set up the optical components for receiving optical signals.

In some embodiments, the primary path 110-1 may experience a path failure due to, for example, a path cut, an optical node failure, etc. When this occurs, a node on the primary path 110-1 may report the path failure to the network controller 102. For example, as illustrated in FIG. 1, a path cut 112 occurs between the node N3 and the node N4. In some embodiments, a node located before the path cut 112, e.g., the node N3, is configured to detect the path cut 112 and send to the network controller 102 a failure notification indicating a failure of the primary path 110-1 between the source node N1 and the destination node N2. In one embodiment, the node N3 may report the path failure to the source node N1, which then sends a failure notification to the network controller 102. In some embodiments, a node located after the path cut 112, e.g., the node N4, is configured to detect the path cut 112 and send to the network controller 102 a failure notification. In one embodiment, the node N4 may report the path failure to the destination node N2, which then sends a failure notification to the network controller 102.

After receiving the failure notification, the network controller 102 is configured to set up the restoration path 110-2 for the primary path 110-1. Similar to setting up the primary path 110-1, the network controller 102 is configured to perform signaling of the restoration path 110-2 in the control plane and activating the restoration path 110-2 in the data-plane. In some embodiments, in the signaling stage, the source node N1 is configured to transmit a control-plane path message through the nodes in the restoration path 110-2. In some embodiments, the control-plane path message may include a path identifier (ID), a source node ID, a destination node ID, an upstream node ID, and a downstream node ID. Once the path message reaches the destination node N2, the destination node N2 is configured to transmit a control-plane path reservation message traversing the restoration path 110-2 to the source node N1, thereby reserving light-path resources for the restoration path 110-2.

After the signaling process is complete, the network controller 102 is configured to activate the restoration path 110-2 in a data-plane. In some embodiments, the network controller 102 is configured to forward, to the optical nodes N1, N6, N7, N8, and N2 of the restoration path 110-2, data-plane parameters for optical components of the optical nodes N1, N6, N7, N8, and N2 of the restoration path 110-2. The data-plane parameters for the optical components are forwarded in parallel to the optical nodes in the restoration path 110-2 so as to activate the restoration path. Example optical components of the optical nodes may include at least one of a variable optical attenuator, an optical amplifier, or a transceiver. The data-plane parameters are to set up the optical components of the optical nodes in the restoration path 110-2. For example, the data-plane parameters may be indicative of a power level an optical component is expected to receive from its upstream node or may set a logic state of an optical component. Once provisioned, the nodes of the restoration path 110-2 may be able to receive optical signals. At the completion of the activation process, the network controller 102 switches traffic from the primary path 110-1 to the restoration path 110-2.

In some embodiments, the network controller 102 is configured to determine the data-plane parameters for the optical components of the optical nodes based on previously-obtained data-plane parameters for optical components in optical nodes of the optical network 106. For example, the network controller 102 may maintain prior data-plane parameters for optical components in a repository and use those prior data-plane parameters to determine the data-plane parameters for the optical components of the optical nodes in the restoration path 110-2. In some embodiments, the data-plane parameters for the optical components in the restoration path 110-2 are determined using a machine learning algorithm applied to the previously-obtained data-plane parameters. For example, the network controller 102 may include machine learning logic to process the previously-obtained data-plane parameters to generate the data-plane parameters for the optical components in the restoration path 110-2.

In some embodiments, after the traffic is switched from the primary path to the restoration path, the network controller 102 is configured to obtain status information for the optical components in the restoration path. For example, the network controller 102 may obtain actual power levels at the nodes of the restoration path 110-2. Based on the status information, the network controller 102 is configured to adjust the data-plane parameters for the optical components of the nodes in the restoration path to produce updated data-plane parameters. The network controller 102 then forwards in parallel the updated data-plane parameters for the optical components to the optical nodes of the restoration path 110-2 to tune, in parallel, the optical components.

As described above, because the network controller performs data-plane activation in parallel on the optical nodes of the restoration path, the techniques disclosed herein reduce the time used to set up the restoration path for traffic, particularly during the data-plane activation stage. As a result, the techniques improve user experience of the network responses even when a path failure occurs in the optical network.

Figure 2:
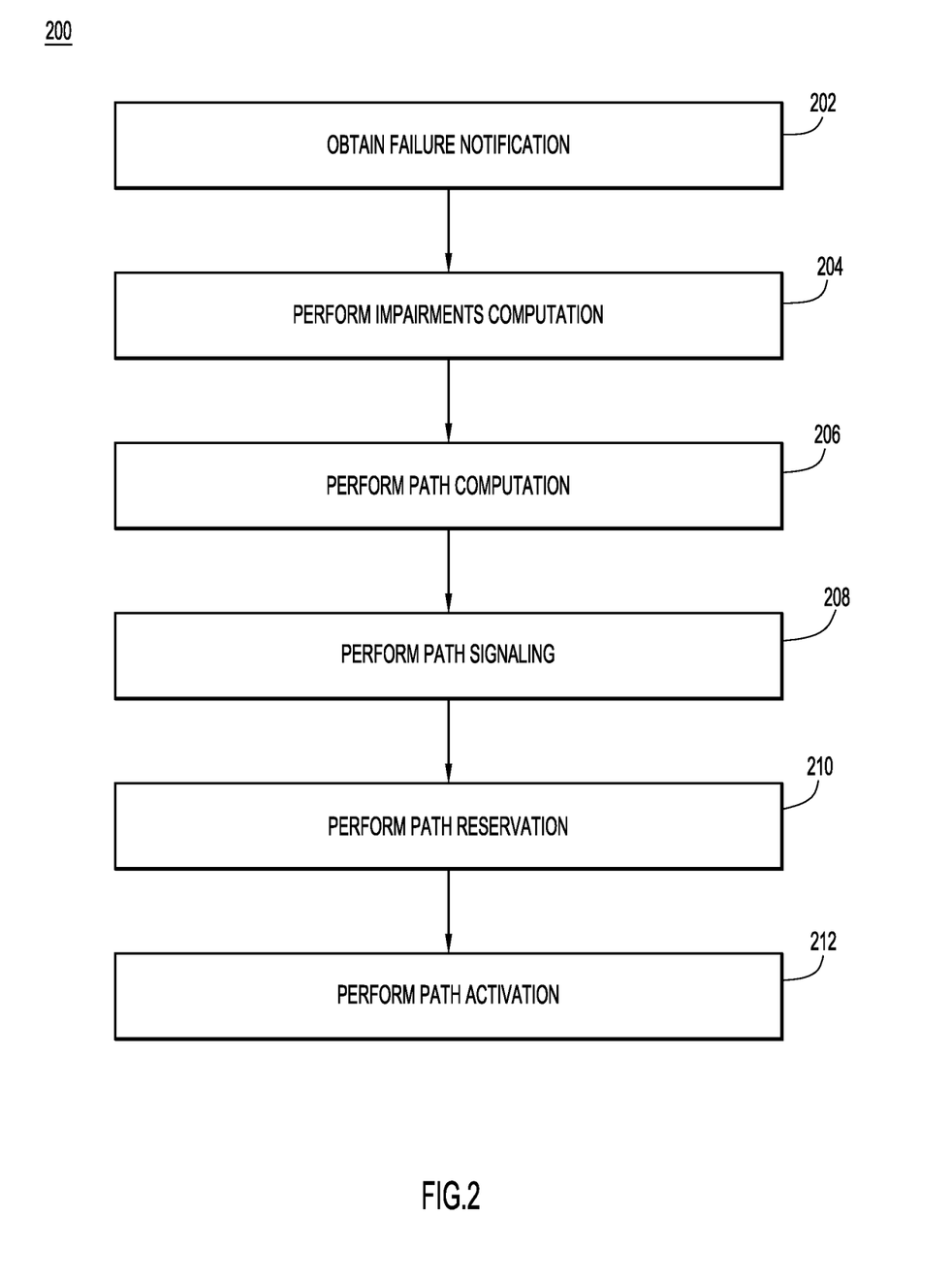
FIG. 2 is a flow diagram depicting a method for setting up a restoration path for a failed primary path in an optical network, according to an example embodiment.

Reference is made to FIG. 2. FIG. 2 is a flow diagram depicting a method 200 for setting up a restoration path for a failed primary path in an optical network, according to an example embodiment. For example, the method 200 may be performed by a server/network controller, e.g., server/network controller 102 in FIG. 1. At 202, the network controller obtains a failure notification indicating that a primary path of the optical network fails. For example, an optical node residing before or after a path cut may detect a loss of signal due to the path cut, and send a notification to the network controller reporting the path failure in the primary path. At 204, the network controller performs an impairments computation. For example, based on the failure notification, the network controller performs a computation to locate the failed link or optical node(s) that causes the primary path to fail. At 206, the network controller computes a restoration path to replace the primary path. Based on the source node, the destination node, and information about the failed link or node, the network controller is configured to identify one or more intermediate nodes that can connect the source node to the destination node. Based on available resources on the intermediate nodes, the network controller computes a restoration path for the failed primary path.

At 208, the network controller performs a path signaling process for the restoration path. For example, in the path signaling process, the network controller may generate a control-plane path message to be circulated from the source node to the destination node. The control-plane path message may include a path ID, a source node ID, a destination node ID, an upstream node ID, and a downstream node ID. The control-plane path message is forwarded to the source node, which then transmits it through one or more intermediate nodes to the destination node so that the nodes in the restoration path are aware of their upstream and upstream nodes. At 210, the network controller performs a control-plane path reservation process. For example, after receiving the control-plane path message, the destination node generates and transmits a path reservation message through the one or more intermediate nodes in the restoration path to the source node. The path reservation message enables the nodes in the restoration path to reserve resources for the restoration path. Upon receiving the reservation message, the nodes send notifications to the network controller indicating confirmation of resource reservation. At 212, the network controller performs a path activation process. For example, the network controller generates and forwards, in parallel to the optical nodes in the restoration path, data-plane parameters for optical components of the optical nodes. Applying the data-plane parameters to the optical components of the optical nodes in the restoration path prepares the optical components to receive optical signals from an upstream node and transmit optical signals to a downstream node, thereby enabling traffic from the source node to the destination node.

Figure 3:
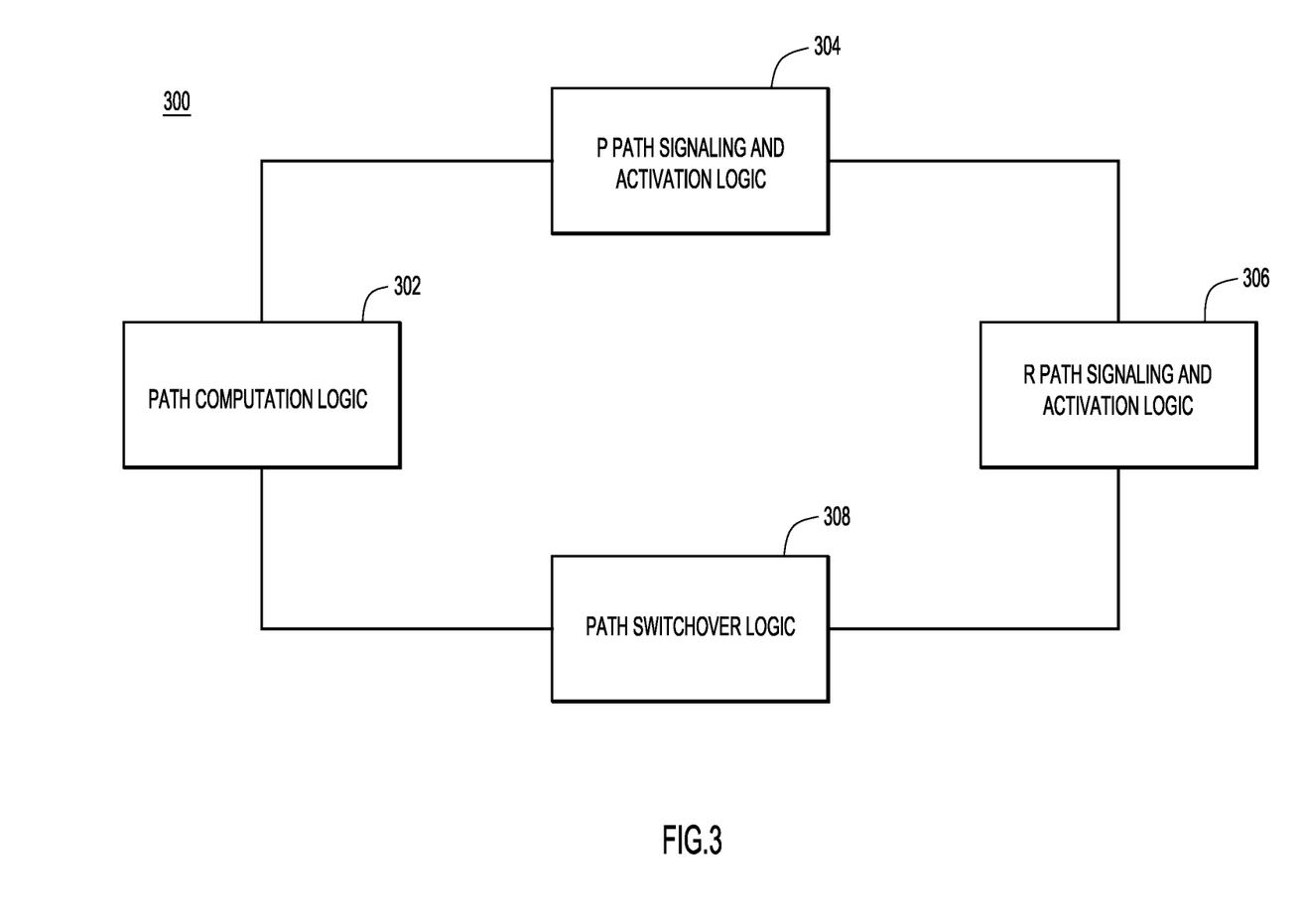
FIG. 3 is a functional diagram of a software process executable by one or more processors of a server/network controller to set up paths in an optical network, according to an example embodiment.

Reference is now made to FIG. 3. FIG. 3 is a functional diagram of a software process 300 executable by one or more processors of a server/network controller (e.g., server/network controller 102 in FIG. 1) to set up paths in an optical network, according to an example embodiment. The software process 300 includes path computation logic 302, primary (P) path signaling and activation logic 304, restoration (R) path signaling and activation logic 306, and path switchover logic 308. The path computation logic 302 is configured to compute paths based on a user demand. For example, a network administrator may send to the network controller a request to send communication traffic from a source node to a destination node. The network controller employs the path computation logic 302 to compute one or more paths for the request based on network resources in the network. The network controller may then select a primary path from the computed paths that satisfies a user-provided path policy.

The primary path signaling and activation logic 304 is configured to perform signaling and activation of a primary path selected by the path computation logic 302. In the signaling stage, the primary path signaling and activation logic 304 is employed to signal the nodes and to reserve resources in the primary path in a control plane. In the activation stage, the primary path signaling and activation logic 304 is employed to generate and provide data-plane parameters to tune optical components of the nodes in the primary path such that the optical components are prepared to receive and transmit optical signals.

The restoration path signaling and activation logic 306 is configured to perform signaling and activation of a restoration path computed and selected by the path computation logic 302. After the network controller obtains notification that the primary path fails, the restoration path signaling and activation logic 306 is invoked to set up the restoration path to replace the primary path. Similarly, in the signaling stage, the restoration path signaling and activation logic 306 is employed to signal the nodes and to reserve resources in the restoration path. In the activation stage, the restoration path signaling and activation logic 306 is employed to generate and provide data-plane parameters to tune optical components of the nodes in the restoration path such that the optical components are prepared to receive and transmit optical signals. The path switchover logic 308 is configured to switch traffic from the failed primary path to the restoration path once the restoration path has been signaled and activated.

Figure 4:
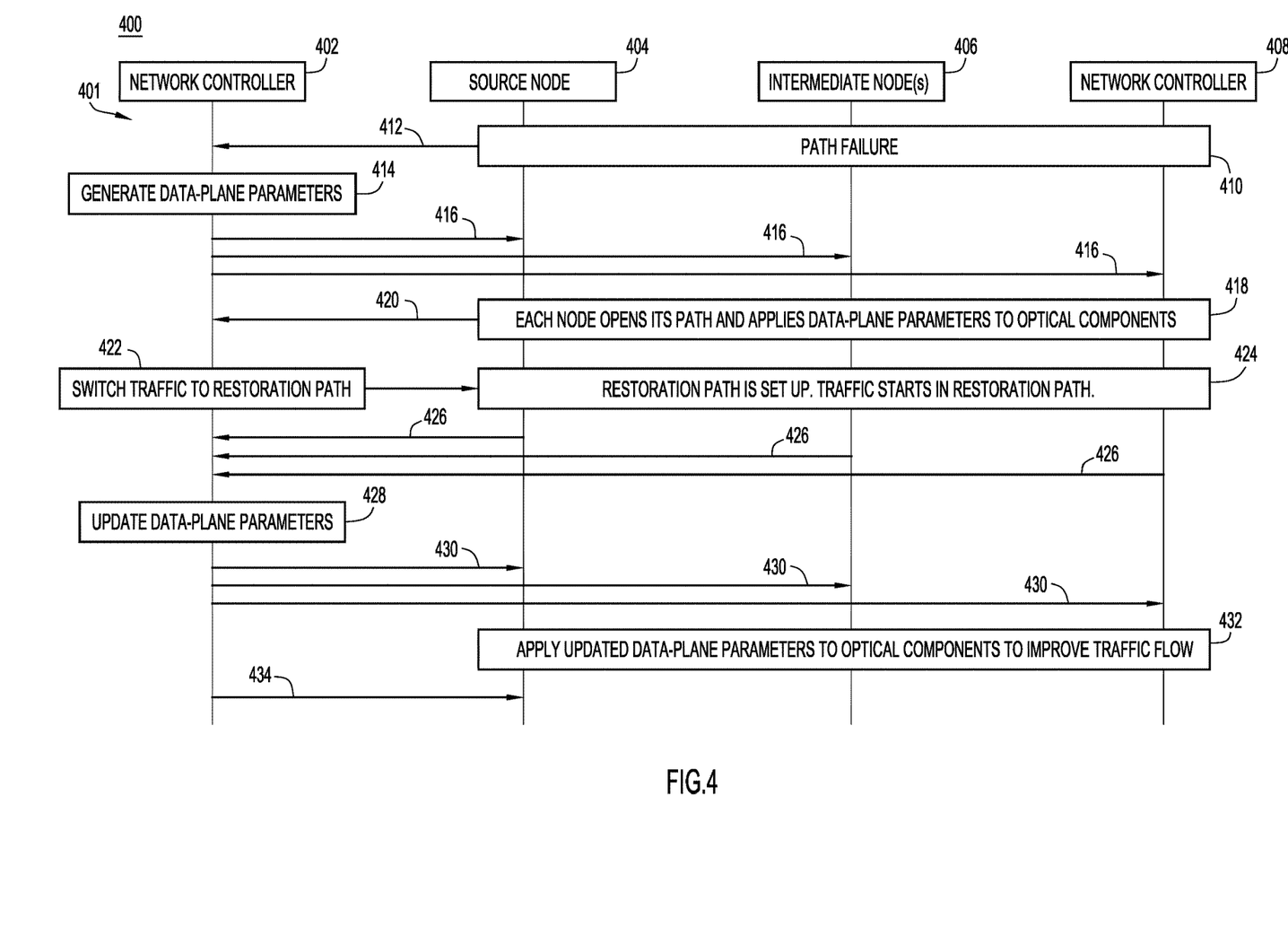
FIG. 4 is a sequence diagram illustrating a method for setting up a restoration path for a failed primary path in an optical network, according to an example embodiment.

FIG. 4 is a sequence diagram illustrating a method 400 for setting up a restoration path for a failed primary path in an optical network, according to an example embodiment. The method 400 is implemented in an optical network 401 that includes a network controller 402, a source node 404, one or more intermediate nodes 406, and a destination node 408. The source node 404, the one or more intermediate nodes 406, and the destination node 408 are optical nodes, e.g., ROADM nodes, that include one or more optical components configured to transmit and receive optical signals. At 410, one of the source node 404, the one or more intermediate nodes 406, or the destination node 408 detects a path failure in the primary path. Example path failures include a path or fiber cut or a node failure. At 412, the node that detects the primary path failure transmits a notification of the path failure to the network controller 402.

In response to receiving the notification, at 414, the network controller 402 generates data-plane parameters for optical components of optical nodes in the restoration path. Example optical components of an optical node may include at least one of a variable optical attenuator, an optical amplifier, or a transceiver. The network controller 402 may generate the data-plane parameters for the optical components based on previously-obtained data-plane parameters for optical components in optical nodes of the optical network 401. For example, the network controller 402 can obtain prior setting parameters for optical components of optical nodes when those optical nodes are employed by another optical path (primary or restoration). The network controller 402 may use those prior setting parameters of optical components to predict/generate new data-plane parameters for the optical components of the optical nodes in the current restoration path. In some embodiments, the network controller 402 may use machine learning logic applied to the previously-obtained data-plane parameters to generate the new data-plane parameters.

At 416, the network controller 402 forwards in parallel to the optical nodes, including the source node 404, one or more intermediate nodes 406, and the source node 408, the data-plane parameters for the optical components of the optical nodes in the restoration path. The one or more intermediate nodes in the restoration path may be different from the intermediate node that detects the primary path failure. At 418, in response to receiving the data-plane parameters for its optical components, a node in the restoration path opens its path and applies the data-plane parameters to its optical components. For example, a node in the restoration path may use the data-plane parameters to set attenuation of its variable optical attenuator and/or to set the node's local logic. At 420, the nodes in the restoration path return acknowledgements to the network controller 402 indicating receipt of the data-plane parameters.

At 422, in response to obtaining the acknowledgement, the network controller 402 switches traffic from the primary path to the restoration path. At 424, the restoration path connecting the source node 404 to the destination node 408 is set up and the traffic starts in the restoration path. At 426, as optical signals pass through the nodes in the restoration path, the nodes in the restoration path report to the network controller 402 status information for the optical components of the restoration path. For example, the nodes in the restoration path may report to the network controller 402 actual power levels their optical components experience. At 428, the network controller 402 adjusts, based on the status information, the data-plane parameters for the optical components of the optical nodes in the restoration path to produce updated data-plane parameters. At 430, the network controller 402 forwards in parallel to the optical nodes in the restoration path the updated data-plane parameters. At 432, the nodes in the restoration path apply the updated data-plane parameters to their optical components. Operation 432 further fine tunes the optical components in the restoration path to improve traffic flow.

In some embodiments, operations 422 and 424 may be performed after operation 432. That is, the network controller 402 may delay switching traffic from the primary path to the restoration until after the updated parameters are applied to the optical components of the nodes in the restoration path.

In some embodiments, if operations 418 and/or 432 does not result in an acceptable traffic flow in the restoration path, at 434, the network controller 402 instructs the source node 404 to start sequential tuning in the restoration path. For example, in a sequential tuning process, the source node 404 transmits a first optical signal to a subsequent intermediate node 406. Based on the first optical signal, the subsequent intermediate node 406 sets up its optical components and outputs a second optical signal to its immediate downstream node, e.g., another intermediate node 406 or the destination node 408. The next node also sets up its optical components based on the second optical signal and outputs a third optical signal to its immediate downstream node. This tuning process is performed serially in the nodes of the restoration path until the destination node completes its tuning operation.

The techniques disclosed herein reduces the time to regulate optical components of the nodes in the restoration path. For example, operation 416 enables a coarse open-loop regulation on the optical components of the nodes in the restoration path. In some embodiments, the network controller 402 generates and forwards in parallel VOA parameters that would not cause a power overshoot to the nodes in the restoration path, such that the nodes in the restoration path may individually set up their own optical components, e.g., VOAs, at 418. Because wavelength responses are not flat across fibers and amplifiers and because power loss can vary within a node, the network controller 402 may use modeling methods to generate the data-plane parameters for optical components in the restoration path. In some embodiments, the network controller 402 generates the data-plane parameters based on previously-obtained data-plane parameters for optical components in the optical network. For example, the network controller 402 may use previously-obtained data-plane parameters such as VOAs usage history during their life time and types of amplifiers. In some embodiments, the network controller 402 may access large volumes of historical data-plane parameters for optical components in the optical network. The network controller 402 may employ techniques such as machine learning to generate more accurate data-plane parameters for optical components for operation 416.

In some embodiments, tuning of the optical components at 418 significantly reduces the tuning time as the nodes receive parameters from the network controller 402 in parallel and do not have to wait for the exact optical signals from their upstream node. In some embodiments, the operation 418 may not be able to tune optical components to a target state. A finer tuning (operations 426-432) of the optical components of the nodes in the restoration path may be applied. The finer tuning process is performed as a closed-loop regulation with feedbacks from the nodes and updates to the data-plane parameters based on the feedbacks.

Figure 5A:
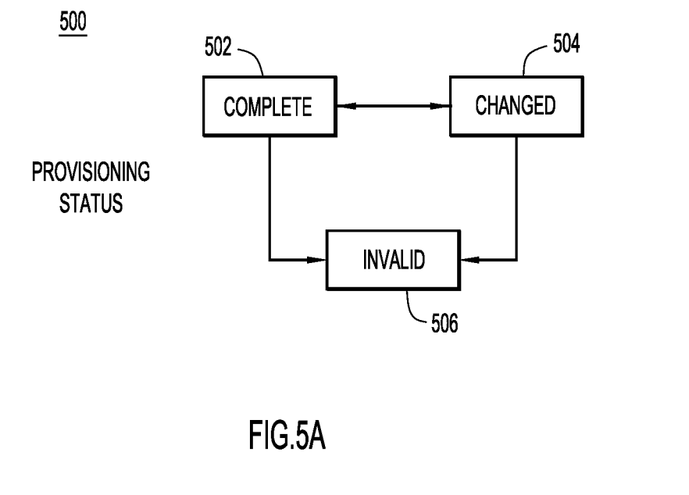
FIG. 5A illustrates a state machine maintained by a network controller in provisioning optical nodes of a restoration path in an optical network, according to an example embodiment.

FIG. 5A illustrates a state machine 500 maintained by a network controller in provisioning optical nodes of a restoration path in an optical network, according to an example embodiment. The state machine 500 includes three states: Complete 502, Changed 504, and Invalid 506. After the network controller forwards to optical nodes in the restoration path data-plane parameters for their optical components and receives acknowledgements from the optical nodes in the restoration path, the network controller sets the provisioning state for the restoration path to the Complete state 502. At some point in time, path resources for the restoration path may be affected by an event in the optical network, which may trigger redistribution of resources. In response to that, the network controller sets the provisioning state for the restoration path to become either the Changed state 504, in which resources are still available but new tuning is needed for the optical components, or Invalid 506, in which resources are taken away and the restoration path can no longer be used. Invalid paths are periodically removed by the network controller. As shown in FIG. 5A, the Complete state 502 may be switched to the Changed state 504 or the Invalid state 506 when the resources for the restoration path changes. After the nodes in the restoration path have been re-provisioned due to resource changes, the Changed state 504 may be switched to the Complete state 502 if re-provisioning is successful or to the Invalid state 506 if the re-provisioning fails.

Figure 5B:
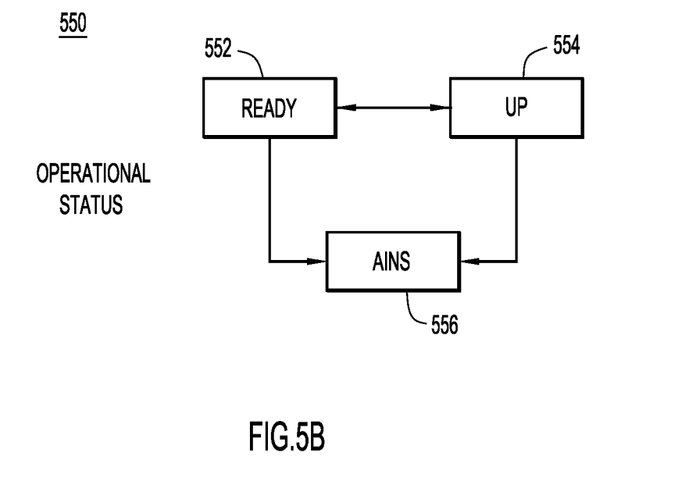
FIG. 5B is a state machine maintained by a network controller in tracking operational status of a restoration path in an optical network, according to an example embodiment.

FIG. 5B illustrates a state machine 550 maintained by a network controller for a restoration path in an optical network, according to an example embodiment. The state machine 550 includes three states: Ready 552, Up 554, and Automatic In-Service (AINS) 556. When the provisioning state for the restoration path is at Complete 502, the network controller sets the operational state for the restoration path to Ready 552, meaning the restoration path is ready to be used. After alarms are cleared and the restoration path is used for traffic, the network controller sets the operational state to Up 554. In some embodiments, the techniques disclosed herein support path reversion. In a path reversion scheme, after the traffic is switched to the restoration path, the primary path may be repaired and ready to carry the traffic again. For example, the network controller may maintain a timer to revert the traffic back to the primary path. If reversion is enabled in the network, the network controller can switch the traffic back to the operational primary path at the expiration of the timer and switch the operational status for the restoration path to AINS state 556 with a provisioning state of Complete 502. At some point in time, when the network controller again switches the traffic from the primary path to the restoration path, the operational status for the restoration path is switched from the AINS state 556 to the Up state 554.

Figure 6:
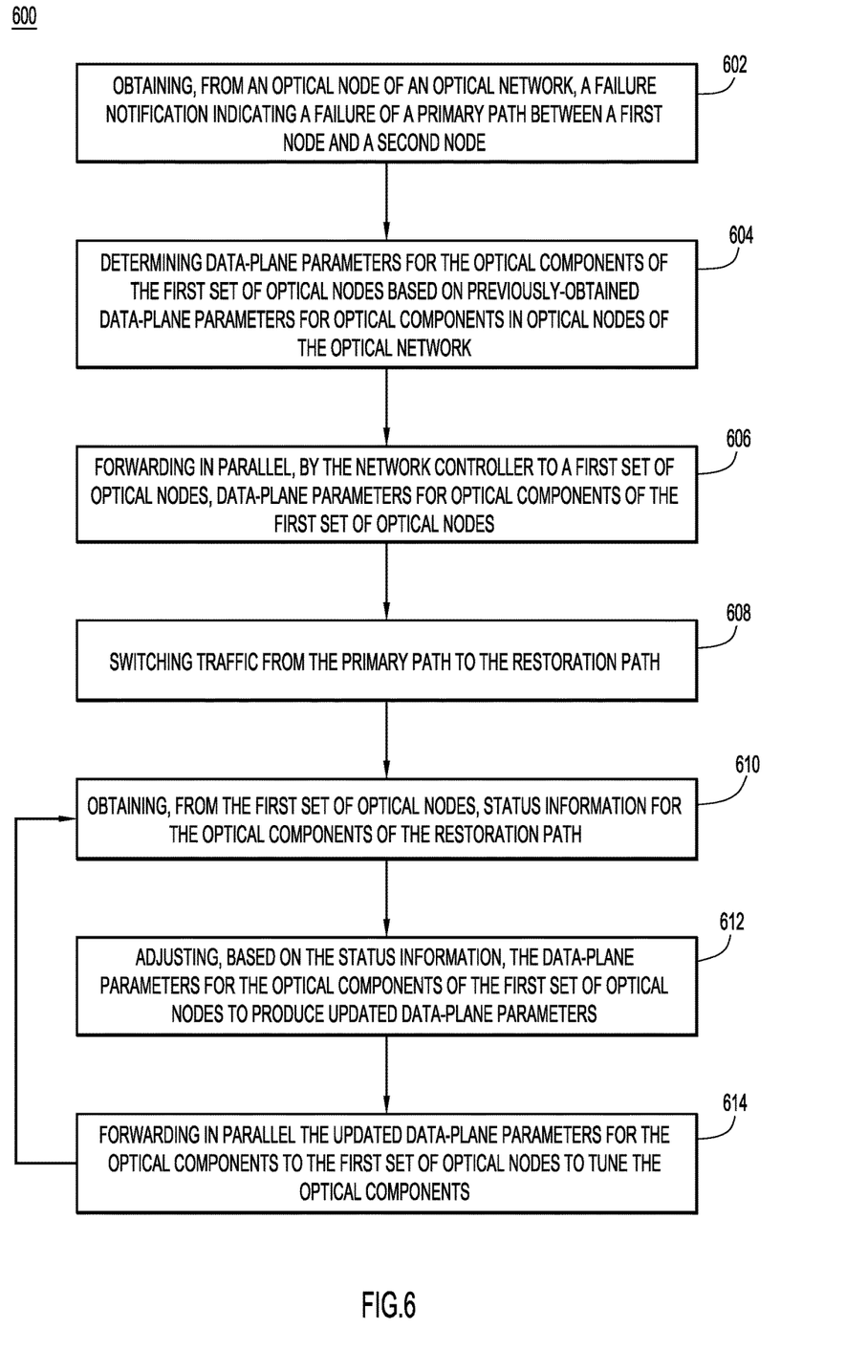
FIG. 6 is a flow chart illustrating a method performed by a network controller to set up a restoration path for a failed primary path in an optical network, according to an example embodiment.

Reference is made to FIG. 6. FIG. 6 is a flow chart illustrating a method 600 performed by a network controller to set up a restoration path for a failed primary path in an optical network, according to an example embodiment. For example, the method 600 may be performed by the network controller 102 in FIG. 1 or the network controller 402 in FIG. 4. At 602, the network controller obtains, from an optical node of the optical network, a failure notification indicating a failure of the primary path between a first/source node and a second/destination node. When detecting a path failure in the primary path, any node in the primary path including the source node, the destination node, and one or more intermediate nodes may be configured to transmit the path failure notification to the network controller. At 604, the network controller determines data-plane parameters for the optical components of the first set of optical nodes in the restoration path based on previously-obtained data-plane parameters for optical components in optical nodes in the optical network. The first set of optical nodes include the first node, the second node, and one or more intermediate nodes, and forms the restoration path for the primary path. For example, the network controller may use modeling methods applied to the previously-obtained data-plane parameters to generate the data-plane parameters for the optical components in the restoration path. In some embodiments, the network controller may use previously-obtained data-plane parameters, such as VOAs usage history during their life time and types of amplifiers, to generate data-plane parameters for the optical components in the restoration path. In some embodiments, the network controller may access historical data-plane parameters for optical components in the optical network and apply a machine learning algorithm to the previously-obtained data-plane parameters to generate data-plane parameters for the optical components in the restoration path.

At 606, the network controller forwards, in parallel, to a first set of optical nodes in the restoration path, the data-plane parameters for the optical components of the first set of optical nodes. At 608, the network controller switches traffic from the primary path to the restoration path.

In some embodiments, at 610, the network controller is configured to obtain, from the first set of optical nodes, status information for the optical components in the restoration path. For example, the network controller may obtain actual power levels at the optical components of the nodes in the restoration path. At 612, the network controller adjusts, based on the status information, the data-plane parameters for the optical components of the first set of optical nodes in the restoration path to produce updated data-plane parameters. In some embodiments, the data-plane parameters provisioned at 606 may not be able to tune the optical components to a target state. The feedback operations at 610 and 612 allow the network controller to adjust the parameters so as to further tune the optical components in the restoration path. At 614, the network controller forwards in parallel the updated data-plane parameters for the optical components to the first set of optical nodes to tune, in parallel, the optical components.

In some embodiments, operations 610-614 may be repeated a number of times to ensure tuning the optical components to their target state. In some embodiments, operations 604-614 may be applied in response to a change to the resources for the restoration path. In some embodiments, the network controller may employ operations similar to those of operations 604-614 to provision a primary path when setting up the primary path.

Figure 7:
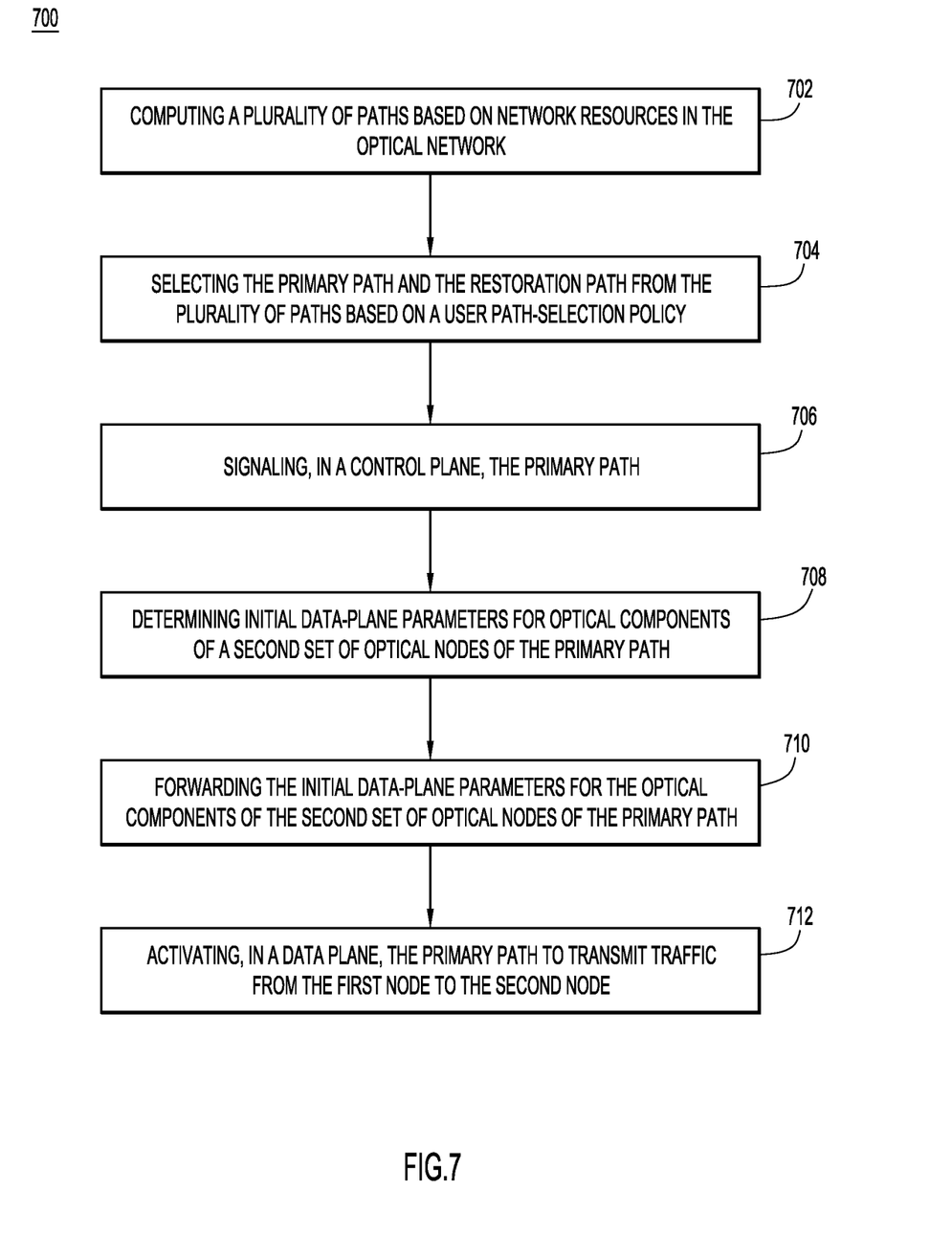
FIG. 7 is a flow chart illustrating a method performed by a network controller to set up a primary path for traffic in an optical network, according to an example embodiment.

Reference is made to FIG. 7. FIG. 7 is a flow chart illustrating a method 700 performed by a network controller to set up a primary path for traffic in an optical network, according to an example embodiment. For example, the method 600 may be performed by the network controller 102 in FIG. 1. At 702, the network controller computes a plurality of paths between a source node and a destination node based on network resources in the optical network. In some embodiments, optical nodes in the network are configured to periodically provide streaming telemetry updates to the network controller for changes to the path resources. The network controller can use these resource update messages to determine the available resource of the nodes and compute paths that can connect the source node to the destination node. At 704, the network controller selects a primary path and a restoration path from the plurality of paths based on a user path-selection policy. For example, the network controller may sort and store the computed optical paths based on user-provided path performance metrics, such as latency, a number of hops, or resource availability. In some embodiments, the first two available best paths that satisfy path constraints provided by the path policy are selected as the primary path and the restoration path. In some embodiments, the network controller may select the restoration path after the primary path fails.

At 706, the network controller performs signaling of the primary path in a control plane. In some embodiments, in the signaling stage, the network controller generates a control-plane path message for the source node to transmit through the nodes in the primary path. In some embodiments, the control-plane path message may include a path ID, a source node ID, a destination node ID, an upstream node ID, and a downstream node ID. Once the path message reaches the destination node, the destination node is configured to transmit a control-plane path reservation message traversing the primary path to the source node, thereby reserving path resources for the primary path. After signaling the primary path, the network controller is configured to activate the primary path. In the activation stage, at 708, the network controller determines initial data-plane parameters for optical components of optical nodes in the primary path. For example, the network controller determines the initial data-plane parameters based on previously-obtained data-plane parameters for optical components in optical nodes of the optical network. In some embodiments, the network controller may use modeling methods and machine learning algorithms to generate the initial data-plane parameters for the optical components in the primary path.

At 710, the network controller forwards to the optical nodes in the primary path the initial data-plane parameters to enable the nodes in the primary path to set up their optical components for receiving and transmitting optical signals. In some embodiments, the initial data-plane parameters are forwarded to the nodes in the primary path in parallel to shorten the time used to tune the optical components of the nodes. At 712, the network controller activates, in a data plane, the primary path to transmit traffic from the source node to the destination node.

Figure 8:
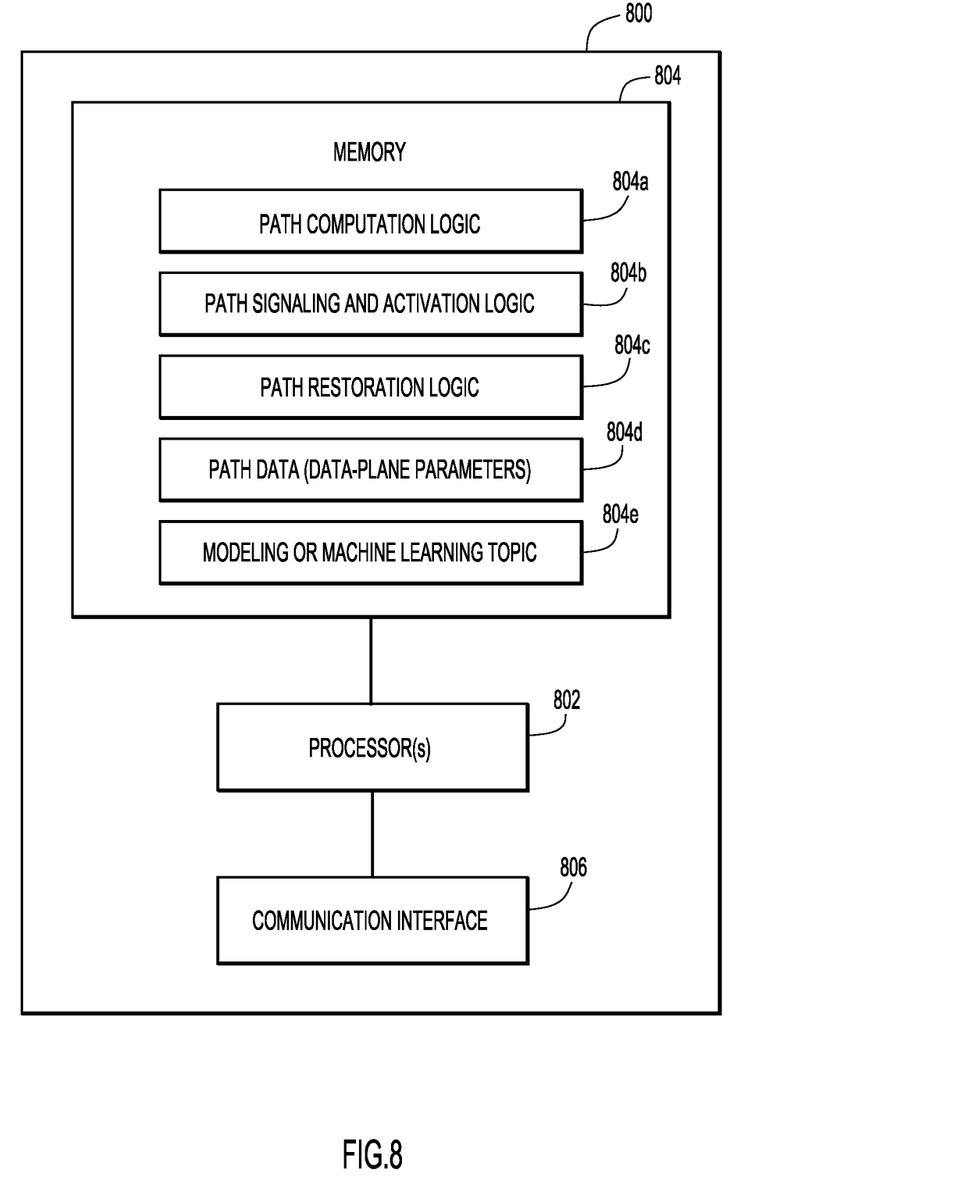
FIG. 8 depicts a block diagram of a server/network controller configured to manage optical paths in an optical network, according to one example embodiment.

FIG. 8 depicts a block diagram of a server/network controller 800 configured to manage optical paths in an optical network, according to one example embodiment. For example, the server 800 can be the server/network controller 102 in FIG. 1. The server 800 includes a processor 802, a memory 804, and a communication interface 806. The processor 802 may be a microprocessor or microcontroller (or multiple instances of such components) that is configured to execute program logic instructions (i.e., software modules) for carrying out various operations and tasks described herein. For example, the processor 802 is configured to execute instructions stored in the memory 804 for the operations disclosed above.

The memory 804 may include read only memory (ROM), random access memory (RAM), magnetic disk storage media devices, optical storage media devices, flash memory devices, electrical, optical or other physical/tangible memory storage devices. The memory 804 stores a path computing logic 804*a*, a path signaling and activation logic 804*b*, a path restoration logic 804*c*, path data 804*d*, and a modeling or machine learning logic 804*e*. The path computing logic 804*a* includes instructions for computing available paths between a source node and a destination node. The path signaling and activation logic 804*b* includes instructions for signaling and activating one or more paths as so to prepare a path for transmitting traffic from the source node to the destination node. The path restoration logic 804*c* includes instructions for setting up a restoration path to replace a failed primary path between the source node and the destination node. The path data 804*d* includes path-related data such as path status information of the paths managed by the server 800, historical and current control-plane and data-plane parameters for the nodes in the network, power levels at the nodes, etc. The modeling or machine learning logic 804*e* includes instructions for generating data-plane parameters for optical components of the nodes in a primary or restoration path.

The functions of the processor 802 may be implemented by logic encoded in one or more tangible (non-transitory) computer-readable storage media (e.g., embedded logic such as an application specific integrated circuit, digital signal processor instructions, software that is executed by a processor, etc.), wherein the memory 804 stores data used for the operations described herein and stores software or processor executable instructions that are executed to carry out the operations described herein.

In one embodiment, the processor 802 may be embodied by digital logic gates in a fixed or programmable digital logic integrated circuit, which digital logic gates are configured to perform storage and accessing control operations described herein. In general, the path computing logic 804*a*, the path signaling and activation logic 804*b*, the path restoration logic 804*c*, and the modeling or machine learning logic 804*e* may be embodied in one or more non-transitory computer-readable storage media encoded with software comprising computer executable instructions and when the software is executed operable to perform the operations described herein.

The communication interface 806 is configured to transmit communications to, and receive communications from, a computer network for the server 800. In one example, the communication interface 806 may take the form of one or more network interface cards.

Figure 9:
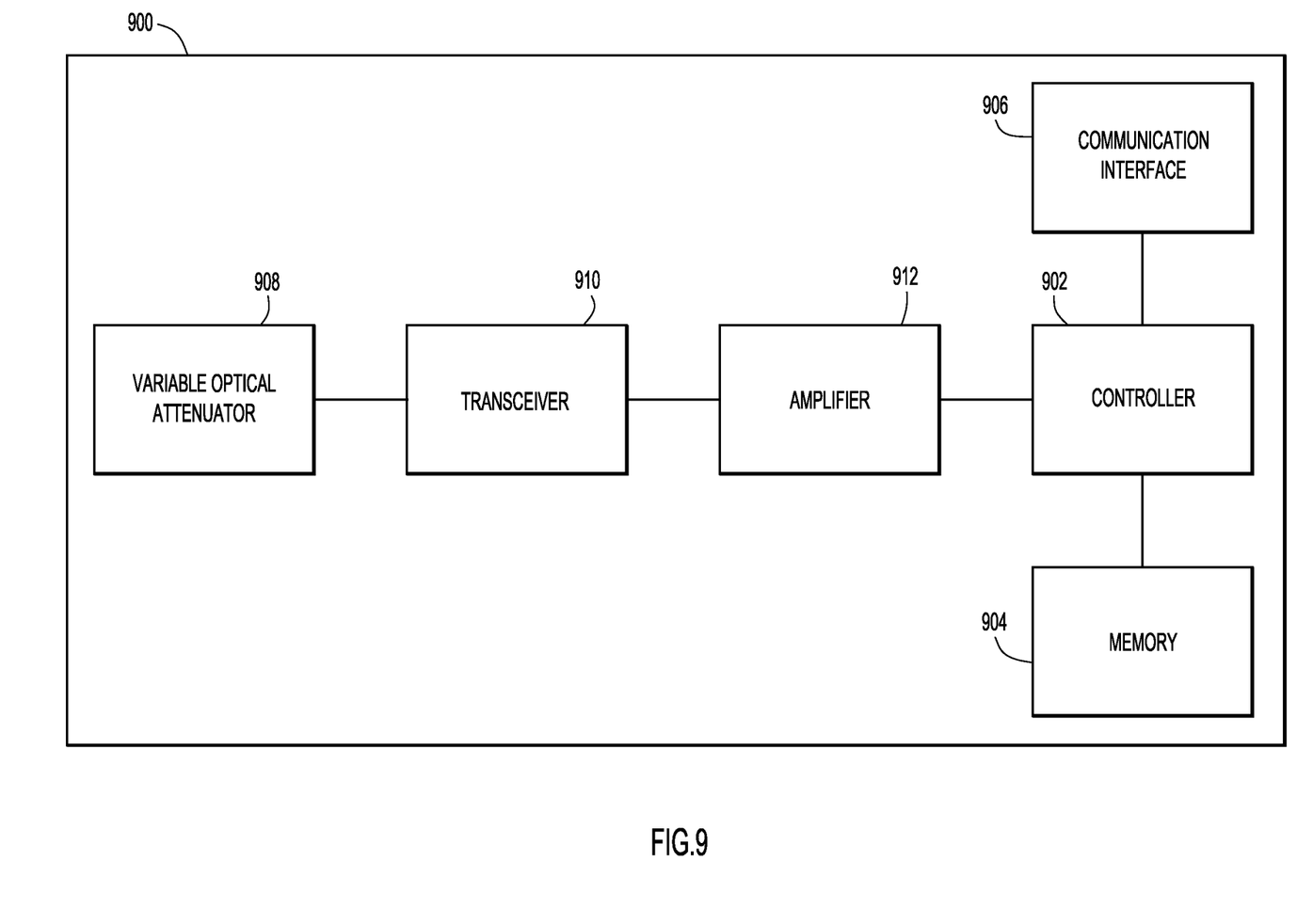
FIG. 9 depicts a block diagram of an optical node that can be employed in an optical network and participate in the optical path restoration techniques presented herein, according to one example embodiment.

FIG. 9 depicts a block diagram of an optical node 900 configured to participate in the path restoration techniques, according to an example embodiment. The optical node 900 can be any of the optical nodes 104 shown in FIG. 1. The optical node 900 includes a controller 902, a memory 904, a communication interface 906, a variable optical attenuator 908, a transceiver 910, and an amplifier 912. The controller 902 may be a microprocessor or microcontroller (or multiple instances of such components) that is configured to execute program logic instructions (i.e., software modules) for carrying out various operations and tasks described herein.

The memory 904 may include ROM, RAM, magnetic disk storage media devices, optical storage media devices, flash memory devices, electrical, optical or other physical/tangible memory storage devices. The memory 904 may store data for tuning the optical components, e.g., the variable optical attenuator 908, the transceiver 910, and the amplifier 912.

The functions of the controller 902 may be implemented by logic encoded in one or more tangible (non-transitory) computer-readable storage media (e.g., embedded logic such as an application specific integrated circuit, digital signal controller instructions, software that is executed by a processor, etc.), wherein the memory 904 stores data used for the operations described herein and stores software or processor executable instructions that are executed to carry out the operations described herein.

In one embodiment, the controller 902 may be embodied by digital logic gates in a fixed or programmable digital logic integrated circuit, which digital logic gates are configured to perform storage and accessing control operations described herein.

The communication interface 906 is configured to transmit communications to, and receive communications from, a computer network for the optical node 900. In one example, the communication interface 906 may take the form of one or more network interface cards.

The variable optical attenuator 908, the transceiver 910, and the amplifier 912 are optical components that are configured to processing optical signals for the optical node 900. For example, the variable optical attenuator 908 is configured to reduce a power level of an optical signal. The transceiver 910 may include an optical signal sensor and an optical signal emitter configured to receive and transmit optical signals. The amplifier 912 may be an optical amplifier configured to amplify optical signals for the optical node 900.

In summary, the techniques disclosed herein enable a fast wavelength restoration service using parallel activation of optical components in a restoration path to significantly reduce the restoration time. In some embodiments, in a first stage of the restoration, a network controller is employed to provision in parallel optical nodes with data-plane parameters for optical components of the optical nodes in the restoration path. In some embodiments, in a second stage, the network controller is configured to fine tune the optical components in the restoration path by providing updated parameters based on status information (e.g., actual power levels) for the optical components of the restoration path. This two-stage parallel activation of optical components in the restoration path allows a fast restoration of traffic when a primary path fails.

The techniques disclosed herein divide the tuning of optical components into two stages: coarse tuning in parallel in the first stage and fine tuning in the second stage that uses feedback information from the node in the restoration path. The techniques use an external network controller to orchestrate and generate accurate provisioning parameters for optical components in the restoration path. The network controller employed in the techniques introduces at least three benefits over traditional restoration methods. First, the network controller has access to historical tuning data and can use that data to train a model with a machine learning algorithm so that accurate parameters for optical components, e.g., attenuation values can be generated, which can reduce the tuning time for tuning the optical components. Second, the network controller has the processing power to orchestrate parallel tuning so that the optical nodes in the restoration path do not have to wait for each other to complete its tuning, which also significantly reduces the tuning time. Third, a machine learning algorithm can be applied continually on the network controller without burdening the optical network.

In some embodiments, the techniques for fast restoration of traffic may be applied at a selected portion (nodes) in the network managed by a network controller. In some embodiments, the techniques may be applied to the entire network. In some embodiments, resource conflict may be resolved based on path priority. A higher priority path takes precedence over a lower priority path. When the techniques for fast restoration are implemented, a user may be allowed to designate a path priority. When a fast restoration path is not being used for traffic (e.g., its operational state=AINS), the resources of the fast restoration path may be reallocated to higher priority paths.

In one aspect, a method is provided. The method includes obtaining, at a network controller from an optical node of an optical network, a failure notification indicating a failure of a primary path between a first node and a second node; forwarding, by the network controller to a first set of optical nodes, data-plane parameters for optical components of the first set of optical nodes, wherein the first set of optical nodes include the first node, the second node, and one or more intermediate nodes, and forms a restoration path for the primary path, and wherein the data-plane parameters for the optical components are forwarded in parallel to the first set of optical nodes of the restoration path so as to activate the restoration path; and switching traffic from the primary path to the restoration path.

In another aspect, an apparatus is provided. The apparatus includes a network interface that enables network communications, a processor, and a memory to store data and instructions executable by the processor. The processor is configured to execute the instructions to: obtain, from an optical node of an optical network, a failure notification indicating a failure of a primary path between a first node and a second node; forward to a first set of optical nodes data-plane parameters for optical components of the first set of optical nodes, wherein the first set of optical nodes include the first node, the second node, and one or more intermediate nodes, and forms a restoration path for the primary path, and wherein the data-plane parameters for the optical components are forwarded in parallel to the first set of optical nodes of the restoration path so as to activate the restoration path; and switch traffic from the primary path to the restoration path.

In yet another aspect, one or more non-transitory computer-readable storage media are provided. The one or more non-transitory computer-readable storage media are encoded with software comprising computer executable instructions which, when executed by a processor, cause the processor to: obtain, from an optical node of an optical network, a failure notification indicating a failure of a primary path between a first node and a second node; forward to a first set of optical nodes data-plane parameters for optical components of the first set of optical nodes, wherein the first set of optical nodes include the first node, the second node, and one or more intermediate nodes, and forms a restoration path for the primary path, and wherein the data-plane parameters for the optical components are forwarded in parallel to the first set of optical nodes of the restoration path so as to activate the restoration path; and switch traffic from the primary path to the restoration path.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
obtaining, at a network controller from an optical node of an optical network, a failure notification indicating a failure of a primary path between a first node and a second node;
forwarding, by the network controller to a first set of optical nodes, data-plane parameters for optical components of the first set of optical nodes, wherein the first set of optical nodes include the first node, the second node, and one or more intermediate nodes, and forms a restoration path for the primary path, and wherein the data-plane parameters for tuning of the optical components are forwarded in parallel to each of the first set of optical nodes of the restoration path so as to activate the restoration path; and switching traffic from the primary path to the restoration path.

2. The method of claim 1, further comprising:

obtaining, from the first set of optical nodes, status information for the optical components of the restoration path;

adjusting, based on the status information, the data-plane parameters for the optical components of the first set of optical nodes to produce updated data-plane parameters; and forwarding in parallel the updated data-plane parameters for the optical components to the first set of optical nodes to tune the optical components.

3. The method of claim 1, further comprising:

computing, by the network controller, a plurality of paths based on network resources in the optical network;

selecting the primary path and the restoration path from the plurality of paths based on a user path-selection policy;

signaling, in a control plane, the primary path; and activating, in a data plane, the primary path to transmit the traffic from the first node to the second node.

4. The method of claim 3, wherein activating the primary path includes:

determining initial data-plane parameters for optical components of a second set of optical nodes of the primary path; and forwarding the initial data-plane parameters for the optical components of the second set of optical nodes of the primary path to activate the primary path.

5. The method of claim 1, further comprising:

determining the data-plane parameters for the optical components of the first set of optical nodes based on previously-obtained data-plane parameters for optical components in optical nodes of the optical network.

6. The method of claim 5, wherein the data-plane parameters for the optical components of the first set of optical nodes are determined using a machine learning algorithm applied to the previously-obtained data-plane parameters.

7. The method of claim 1, wherein the optical components include at least one of a variable optical attenuator, an optical amplifier, or a transceiver.

8. An apparatus comprising:

a network interface that enables network communications;

a processor; and a memory to store data and instructions executable by the processor, wherein the processor is configured to execute the instructions to:

obtain, from an optical node of an optical network, a failure notification indicating a failure of a primary path between a first node and a second node;

forward, to a first set of optical nodes, data-plane parameters for optical components of the first set of optical nodes, wherein the first set of optical nodes include the first node, the second node, and one or more intermediate nodes, and forms a restoration path for the primary path, and wherein the data-plane parameters for tuning of the optical components are forwarded in parallel to each of the first set of optical nodes of the restoration path so as to activate the restoration path; and switch traffic from the primary path to the restoration path.

9. The apparatus of claim 8, wherein the processor is further configured to:

obtain, from the first set of optical nodes, status information for the optical components of the restoration path;

adjust, based on the status information, the data-plane parameters for the optical components of the first set of optical nodes to produce updated data-plane parameters; and forward in parallel the updated data-plane parameters for the optical components to the first set of optical nodes to tune the optical components.

10. The apparatus of claim 8, wherein the processor is further configured to:

compute a plurality of paths based on network resources in the optical network;

select the primary path and the restoration path from the plurality of paths based on a user path-selection policy;

signal, in a control plane, the primary path; and activate, in a data plane, the primary path to transmit traffic from the first node to the second node.

11. The apparatus of claim 10, wherein the processor is configured to activate the primary path by:

determining initial data-plane parameters for optical components of a second set of optical nodes of the primary path; and forwarding the initial data-plane parameters for the optical components of the second set of optical nodes of the primary path to activate the primary path.

12. The apparatus of claim 8, wherein the processor is further configured to:

determine the data-plane parameters for the optical components of the first set of optical nodes based on previously-obtained data-plane parameters for optical components in optical nodes of the optical network.

13. The apparatus of claim 12, wherein the processor is further configured to determine the data-plane parameters for the optical components of the first set of optical nodes by using a machine learning algorithm applied to the previously-obtained data-plane parameters.

14. The apparatus of claim 8, wherein the optical components include at least one of a variable optical attenuator, an optical amplifier, or a transceiver.

15. One or more non-transitory computer-readable storage media encoded with software comprising computer executable instructions which, when executed by a processor, cause the processor to:

obtain, from an optical node of an optical network, a failure notification indicating a failure of a primary path between a first node and a second node;

forward, to a first set of optical nodes, data-plane parameters for optical components of the first set of optical nodes, wherein the first set of optical nodes include the first node, the second node, and one or more intermediate nodes, and forms a restoration path for the primary path, and wherein the data-plane parameters for tuning of the optical components are forwarded in parallel to each of the first set of optical nodes of the restoration path so as to activate the restoration path; and switch traffic from the primary path to the restoration path.

16. The one or more non-transitory computer-readable storage media of claim 15, wherein the instructions cause the processor to:

obtain, from the first set of optical nodes, status information for the optical components of the restoration path;

adjust, based on the status information, the data-plane parameters for the optical components of the first set of optical nodes to produce updated data-plane parameters; and forward in parallel the updated data-plane parameters for the optical components to the first set of optical nodes to tune the optical components.

17. The one or more non-transitory computer-readable storage media of claim 15, wherein the instructions cause the processor to:

compute a plurality of paths based on network resources in the optical network;

select the primary path and the restoration path from the plurality of paths based on a user path-selection policy;

signal, in a control plane, the primary path; and activate, in a data plane, the primary path to transmit traffic from the first node to the second node.

18. The one or more non-transitory computer-readable storage media of claim 17, wherein the instructions cause the processor to activate the primary path by:

determining initial data-plane parameters for optical components of a second set of optical nodes of the primary path; and forwarding the initial data-plane parameters for the optical components of the second set of optical nodes of the primary path to activate the primary path.

19. The one or more non-transitory computer-readable storage media of claim 15, wherein the instructions cause the processor to:

determine the data-plane parameters for the optical components of the first set of optical nodes based on previously-obtained data-plane parameters for optical components in optical nodes of the optical network.

20. The method of claim 1, further comprising:

generating the data-plane parameters for tuning of the optical components of the first set of optical nodes based on prior data-plane parameters for a plurality of optical components stored in a memory.

* * * * *